May 24, 1932.    G. S. POWERS    1,859,790
PROTECTIVE SYSTEM FOR MOTION PICTURE MACHINES
Filed Nov 14, 1929    6 Sheets-Sheet 1

Inventor
George S. Powers.
By Clarence A. O'Brien
Attorney

May 24, 1932.  G. S. POWERS  1,859,790
PROTECTIVE SYSTEM FOR MOTION PICTURE MACHINES
Filed Nov. 14, 1929   6 Sheets-Sheet 2

Inventor
George S. Powers.
By Clarence A. O'Brien
Attorney

Inventor
George S. Powers.
By Clarence A. O'Brien
Attorney

May 24, 1932.   G. S. POWERS   1,859,790
PROTECTIVE SYSTEM FOR MOTION PICTURE MACHINES
Filed Nov. 14, 1929   6 Sheets-Sheet 4
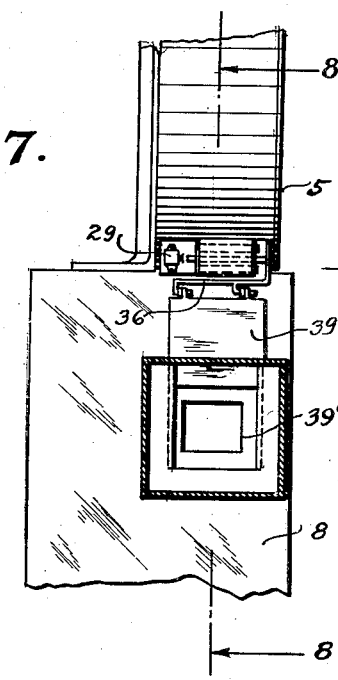
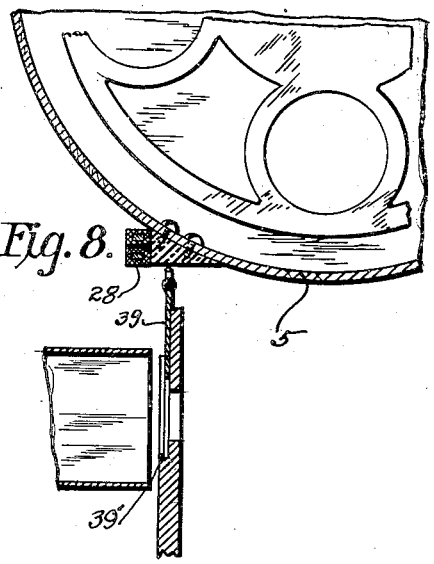
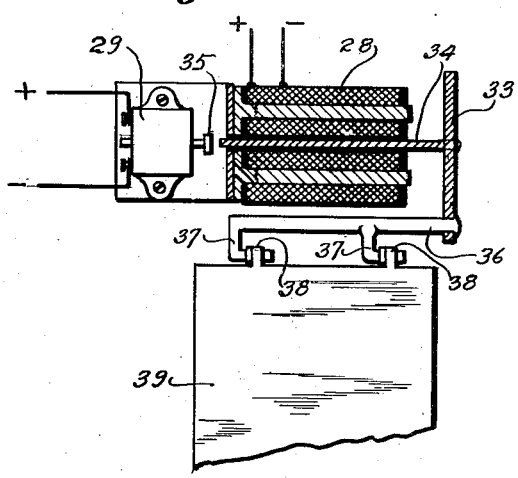
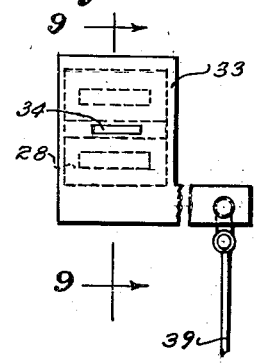
Inventor
George S. Powers.
By Clarence A. O'Brien
Attorney Inventor George S. Powers.

By Clarence A. O'Brien
Attorney

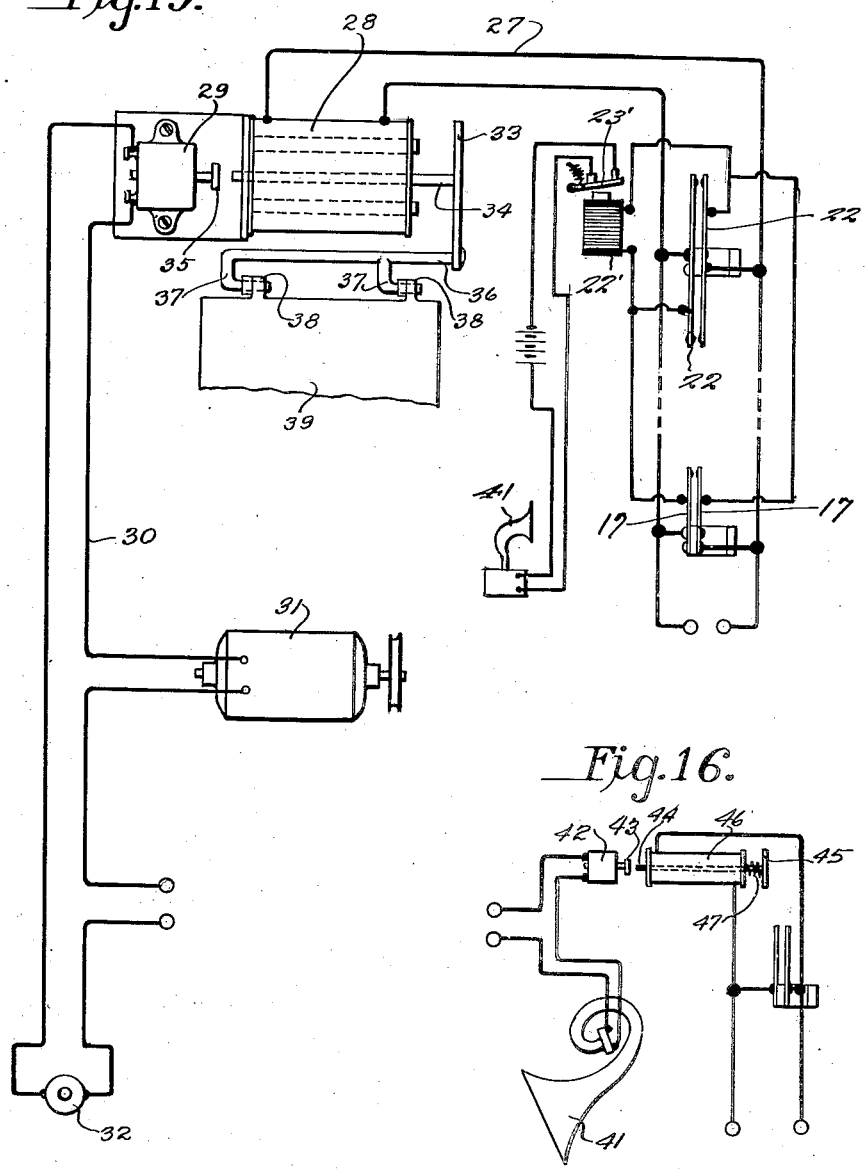

Patented May 24, 1932

1,859,790

UNITED STATES PATENT OFFICE

GEORGE S. POWERS, OF OPELOUSAS, LOUISIANA, ASSIGNOR OF ONE-HALF TO EUGENE VENTRE, OF OPELOUSAS, LOUISIANA

PROTECTIVE SYSTEM FOR MOTION PICTURE MACHINES

Application filed November 14, 1929. Serial No. 407,150.

This invention appertains to new and useful improvements in motion picture machines and more particularly to an electromagnetically operable fire guard and circuit maker and breaker means whereby the light beam may be cut off simultaneously with the stopping of the machine.

The principal object of this invention is to provide a safety mechanism for motion picture machines wherein the machine will automatically stop upon the occurrence of a breakage in the film strip.

During the course of the following specification and claims, numerous other important objects and advantages of the invention will readily become apparent.

In the drawings:

Figure 7 represents a fragmentary sectional and rear elevational view of the improved machine.

Figure 8 represents a vertical sectional view taken substantially on line 8—8 of Figure 7.

Figure 9 represents a fragmentary partial sectional view disclosing the magnetically controlled shutter and its operating means.

Figure 10 represents an end elevational view of the means shown in Figure 9.

Figure 15 represents a diagrammatic view disclosing the connection between the electrical devices of the strip moving system.

Figure 16 represents a diagrammatic view disclosing a portion of the sound reproducing system and the improved means for controlling the same.

Figure 1:
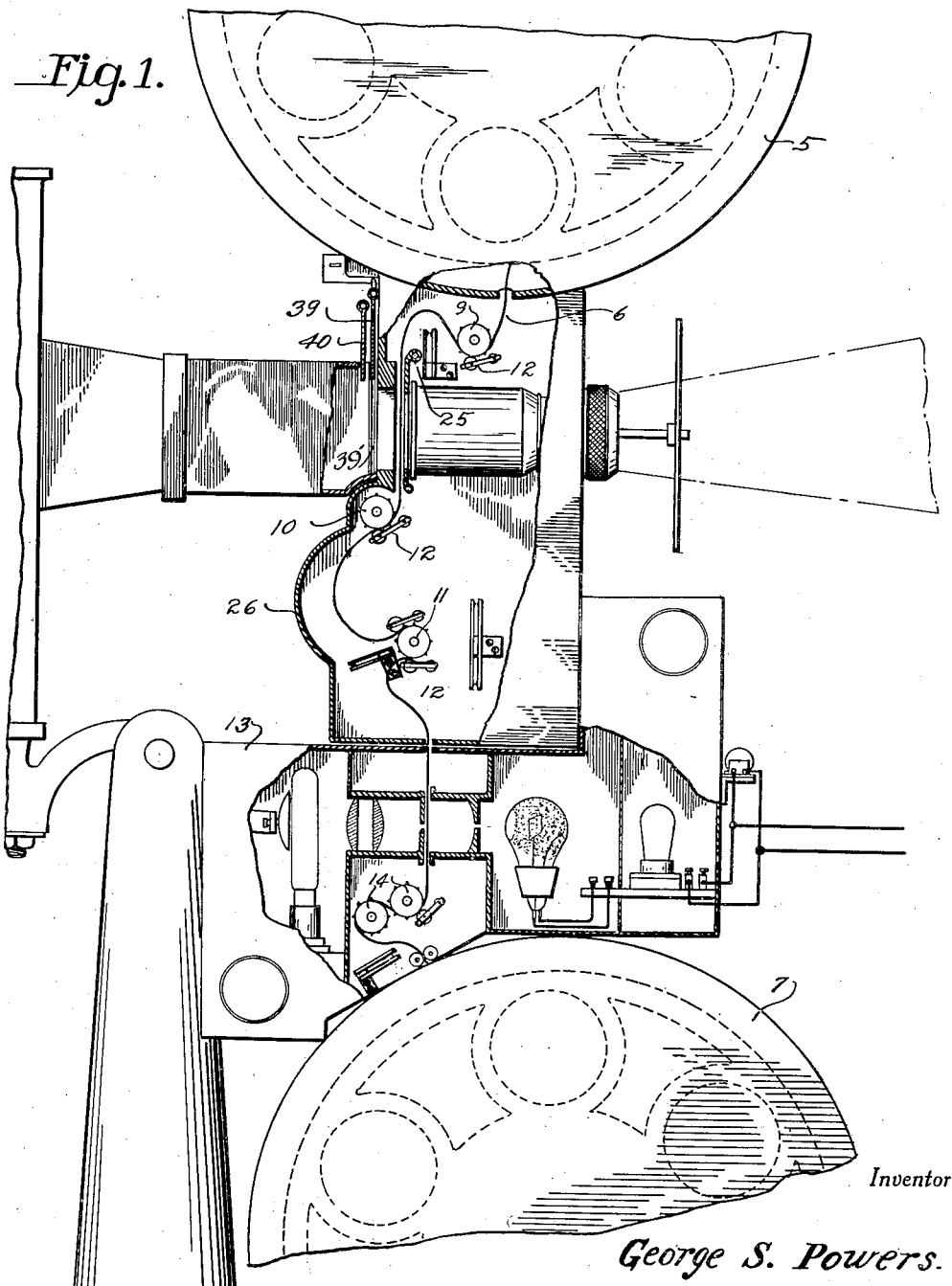
Figure 1 represents a fragmentary elevational and sectional view disclosing a motion picture machine equipped with the improvement.
Figure 2:
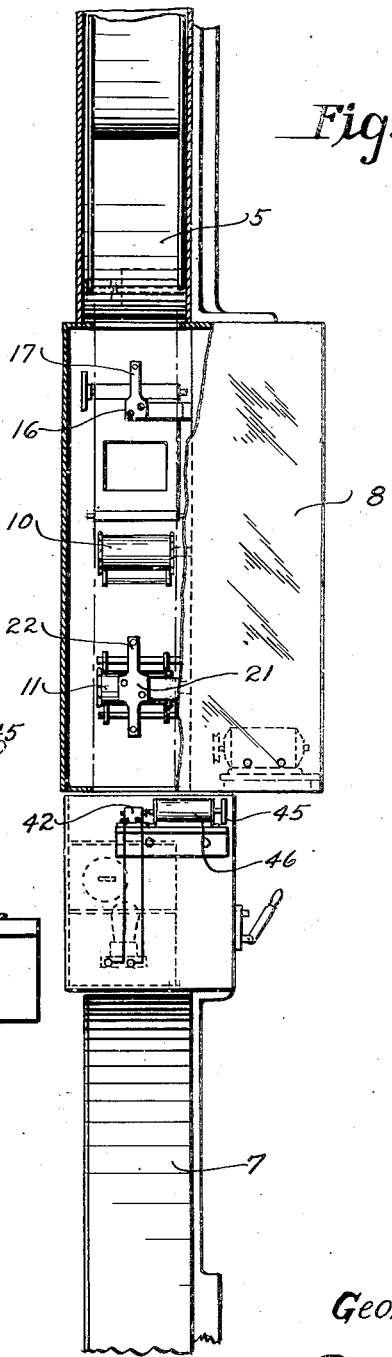
Figure 2 represents a fragmentary partial vertical sectional view through the machine equipped with the improvement.
Figure 3:
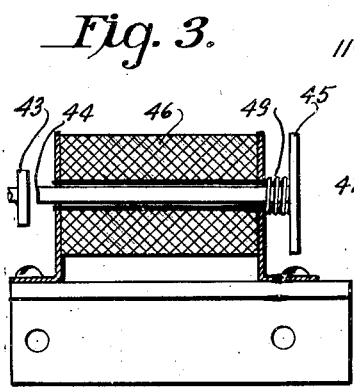
Figure 3 is a longitudinal sectional view through the electro-magnetic means for controlling the sound reproducing mechanism.
Figure 4:
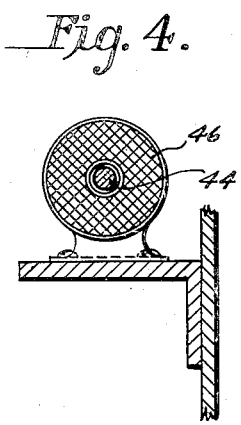
Figure 4 represents a cross sectional view of the magnetic means shown in Figure 3.
Figure 5:
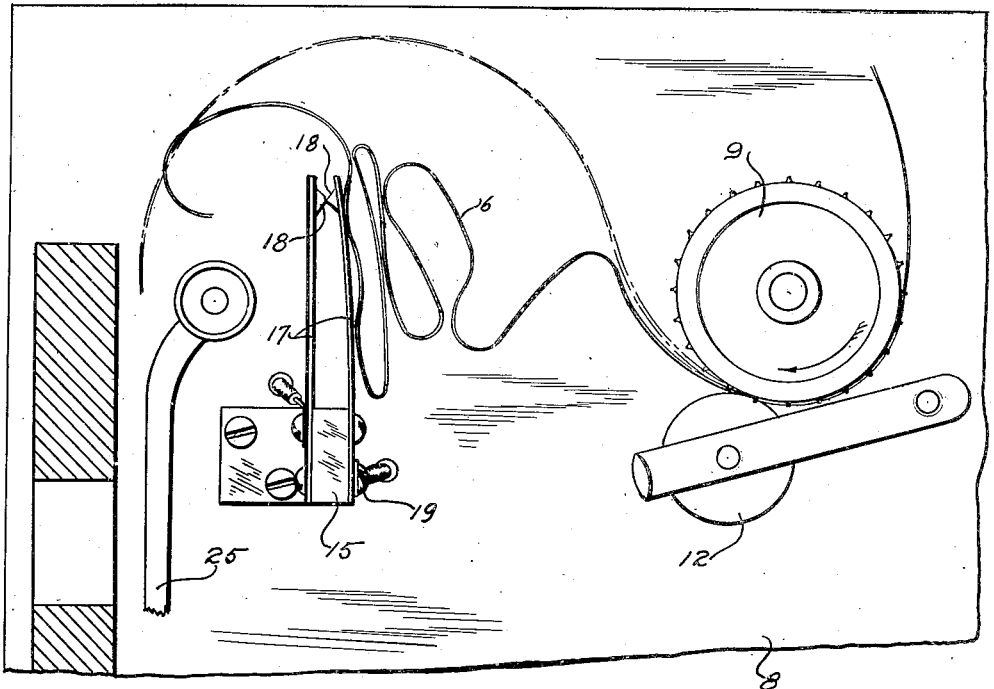
Figure 5 represents an elevational view disclosing the position of the film when broken with respect to the upper feed roll and its corresponding circuit maker.
Figure 6:
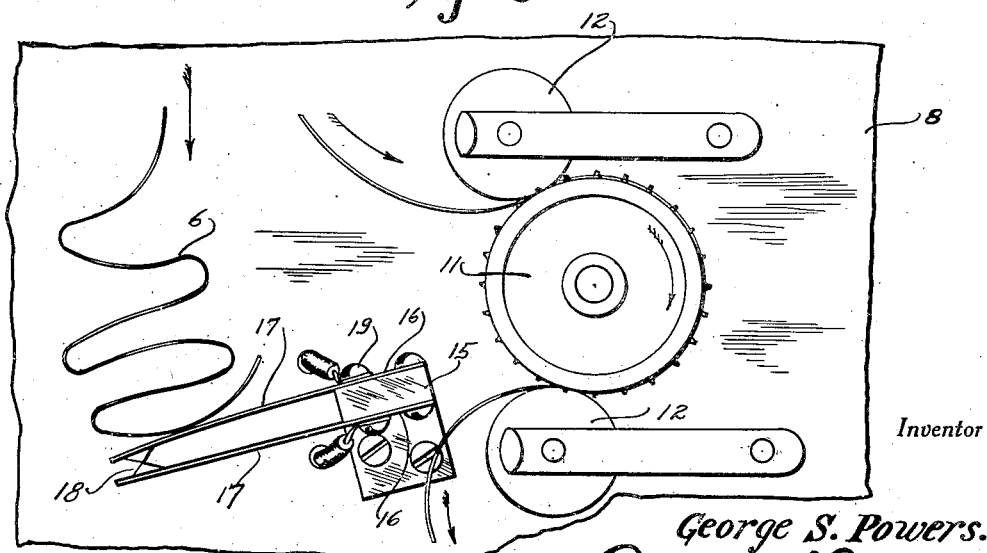
Figure 6 represents an elevational view disclosing the film broken before passing through one of the lower rolls and showing the same banking against the adjoining circuit maker.

Referring to the drawings wherein like numerals designate like parts, it can be seen that numeral 5 represents the usual pay-off reel from which the film strip 6 is payed and ultimately wound on the take-up reel 7. This strip passes through the housing 8, which is interposed between the two reels and as is usual, the feed rolls 9, 10 and 11 are located within the housing 8 for imparting motion to the films. The idler rolls 12 are associated with the feed rolls to maintain the film strip in contact with the feed rolls.

The numeral 13 refers to the housing of the sound reproducing mechanism but this mechanism will not be discussed specifically, excepting for what is shown in Figure 16. However, within the housing 13 are the feed rolls 14—14 for feeding the strip towards the take-up reel 7.

Figure 11:
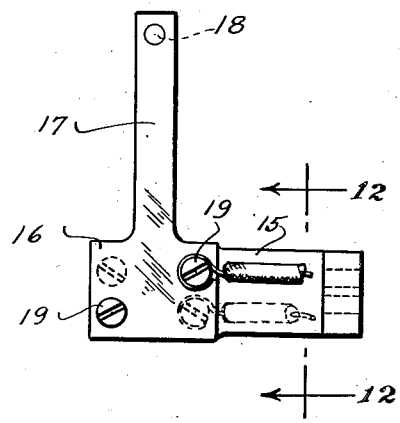
Figure 11 represents a side elevational view of one of the single circuit making switches.
Figure 12:
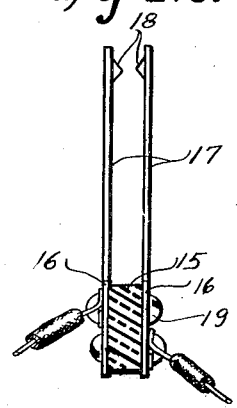
Figure 12 represents a cross sectional view of the switch taken substantially on line 12—12 of Figure 11.
Figure 13:
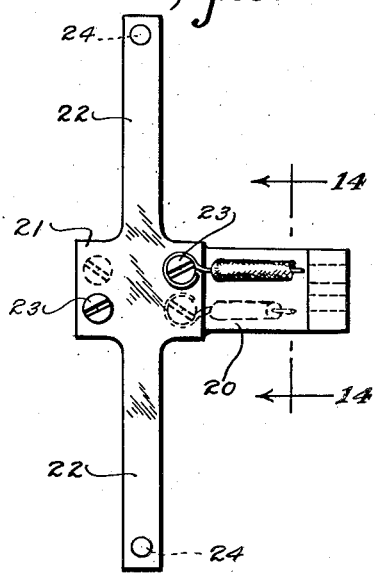
Figure 13 represents a side elevational view of the double switch employed.
Figure 14:
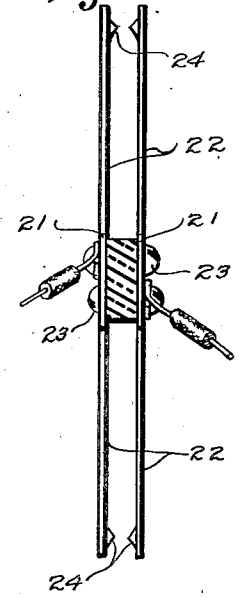
Figure 14 represents a cross sectional view of the double switch taken substantially on line 14—14 of Fig. 13.

In carrying out the invention, switches such as are shown in Figures 11 to 14 inclusive are provided. In Figures 11 and 12, one type of switch is shown which includes a block 15 of some suitable di-electric material which at one end is interposed between the flat enlargement 16 at one end of the arms 17. The free ends of these arms are provided at their inner sides with opposed contact protuberances 18. These arms are of spring material and when the same are flexed toward each other, the contact protuberances will engage.

Certain of the screws 19 employed for securing the enlargement 16 to the block 15 serve as binding posts as is evidenced in Figure 12. The double form of switch is clearly shown in Figures 13 and 14 and includes a block 20 which has one end portion disposed between the pair of plates 21—21. These plates 21—21 each have a pair of arms 22—22 projecting therefrom in opposite directions and in substantial alinement with respect to each other. Certain of the screws employed for securing the plates 21—21 to the block 20 also serve as binding posts. The free ends of the arms 22—22 are provided with contact protuberances 24 at their inner sides and these contacts are adapted to engage in the same manner consistent with the form of switch shown in Figures 11 and 12 as hereinbefore described.

It can be seen one of the single types of switches is interposed between the upper feed roll 9 and the guide plate 25 in a manner that the film will necessarily pass in a slack thereover.

In Figure 1 of the drawings, the rear side of the housing 8 is shown offset as at 26 and this serves as a guideway for the film strip 6. Located at the lower end of this guideway and inclining forwardly is a second switch of the single type shown in Figures 11 and 12. Furthermore a third switch of the single type is located beneath the feed roll 14—14, and within the housing 8 and forwardly of the feed roll 11 is the double type of switch shown in Figures 13 and 14. This double type of switch is disposed on a vertical plane.

It can thus be seen that should the film break between the feed roll 9 and the guide 25, the film strip will buckle up against the uppermost switch and will result in the engagement of the contacts 18 thereof. This will also take place between the rolls 10 and 11 in which instance the film will bank against the intermediate single switch shown adjacent the roll 11.

Located forwardly of the roll 11 is the aforementioned double type of switch which will take care of any breakage of the film beyond the roll 11. Should the film break after it leaves the rolls 14—14 and before it reaches the reel 7, the same will act against the lowermost switch.

All of these switches within the housing 8 are interposed in the magnetic circuit 27, which circuit includes the double coil electromagnet 28. This magnet is located adjacent the switch 29 which is interposed in the motor circuit 30, the motor being denoted by numeral 31. This motor serves to operate the feed roll hereinbefore mentioned and under normal conditions a switch 32 is employed for controlling the motor circuit 30.

The armature 33 which is associated with the magnet 28 has an elongated pushrod 34 projecting therefrom and alined with the movable element 35 of the switch 29. The lower end of this armature 33 carries a laterally disposed arm 36 from which depends a pair of hooks 37—37 engageable in the eyes 38 of a shutter 39. In Figure 1 of the drawings, the numeral 40 represents the usual shutter which is standard equipment on motion picture machines while the shutter 39 is located forwardly of the shutter 40.

Obviously, when one of the switches within the housing 8 is actuated for closing the magnetic circuit, the magnet 28 becomes energized and attracts the armature 33. This results in the projection of the rod 34 against the movable element 35 of the switch 29 and breaks the motor circuit 30.

Thus the motor 31 is brought to a stop and the motion picture apparatus ceases operation. Because of the fact that the switch in the housing 13 is connected in the reproducing circuit, the horn 41 is cut off from this last mentioned mechanism. As is clearly shown in Figure 16, a switch 42 similar in construction to that shown in Figure 15 and denoted by numeral 29 is interposed in the horn circuit and with its movable element 43 aligned with the rod 44.

This rod 44 is carried by the armature 45 which is associated with the electro-magnet 46 and a spring 47 on the said rod 44 serves to maintain the armature 45 normally spaced from the magnet and also the rod 44 is spaced from the movable element 43 of the switch 42. Obviously when the switch in the reproducing mechanism housing is in closed position, the magnet 46 will be energized and the rod 44 will be projected against the switch 42. This will result in the closing of the horn circuit and no sound will be reproduced during the inoperative period of the motion picture machine.

More clearly stated, when the magnet 28 is energized, the shifting of the arm 36 will disengage the hooks 37—37 from the eyes 38 of the shutter 39, thus permitting the shutter 39 to drop into a position obstructing the light beam from passing through the machine and through the film strip while the latter is stationary.

In order to prevent sagging of the fire guard 39, a guideway 39' is provided, and this is clearly shown in Fig. 1. Furthermore, it will be noted in Fig. 15, that when any one of the switches is closed, the electromagnet 22' becomes energized and attracts the armature 23'. Thus, the loud speaker circuit is broken simultaneously with the operation of the fire guard 39.

While the foregoing description sets forth the invention in detail, it is to be understood that various changes in the shape, size and materials may be resorted to without departing from the spirit and scope of the invention as claimed hereinafter.

Having described my invention, what is claimed as new is:

1. In a safety shutter attachment for motion picture machines, a vertically slidable shield having a plurality of aligned eyes, a horizontally disposed longitudinally movable arm in the plane of the shield and having spaced L-shaped elements detachably engaging said eyes to hold the shield releasably in a raised position, and a normally deenergized electromagnet above said arm and having an armature in spaced parallel relation to said arm, and means connecting the armature and said arm to cause the arm to move endwise and release the eye engaging elements from said eyes when the electromagnet is energized.

2. In a safety shutter attachment for motion picture machines, a vertically slidable shield having a plurality of eyes, a longitudinally movable arm above said shield and having elements detachably engaging said eyes to hold the shield releasably in a raised position, and a normally deenergized electromagnet having an armature in spaced parallel relation to said arm, and means connecting the armature and said arm to cause the arm to move endwise and release the eye engaging elements of the arm from said eyes when the electromagnet is energized.

In testimony whereof I affix my signature.

GEORGE S. POWERS.